(12) United States Patent
Duerig et al.

(10) Patent No.: US 7,952,369 B2
(45) Date of Patent: May 31, 2011

(54) DEVICE AND METHOD FOR SENSING A POSITION OF A PROBE

(75) Inventors: Urs T. Duerig, Rueschlikon (CH); Bernd W. Gotsmann, Horgen (CH); Armin W. Knoll, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/544,246

(22) Filed: Aug. 20, 2009

(65) Prior Publication Data

US 2010/0026332 A1 Feb. 4, 2010

Related U.S. Application Data

(62) Division of application No. 11/518,110, filed on Sep. 8, 2006, now Pat. No. 7,755,373.

(30) Foreign Application Priority Data

Sep. 8, 2005 (EP) ..................................... 05405528

(51) Int. Cl.
*G01R 31/02* (2006.01)
(52) U.S. Cl. .............................. 324/750.16; 324/754.01
(58) Field of Classification Search ........................ None
See application file for complete search history.

(56) References Cited

U.S. PATENT DOCUMENTS

| | | | | |
|---|---|---|---|---|
| 5,053,995 A | * | 10/1991 | Kajimura et al. | ............. 369/126 |
| 5,375,114 A | * | 12/1994 | Hatanaka et al. | ............. 369/126 |
| 7,436,748 B2 | * | 10/2008 | Cherubini et al. | ............. 369/101 |
| 7,483,363 B2 | * | 1/2009 | Albrecht | ....................... 369/126 |

* cited by examiner

*Primary Examiner* — Vinh P Nguyen
(74) *Attorney, Agent, or Firm* — William Stock; Anne Vachon Dougherty (57) ABSTRACT

A device for sensing a position of a probe relative to a reference medium, the probe comprising a heater element with a temperature dependent electrical resistance and being adapted to determine probe position by measuring a parameter associated to a thermal relaxation time of the heater element.

2 Claims, 4 Drawing Sheets

DEVICE AND METHOD FOR SENSING A POSITION OF A PROBE

CROSS REFERENCE TO RELATED APPLICATIONS

This is a divisional application from U.S. patent application Ser. No. 11/518110 filed Sep. 8, 2006 now U.S. Pat. No. 7,755,373.

TECHNICAL FIELD

The present invention relates to a method and a device for sensing a position of a probe relative to a reference medium.

BACKGROUND OF THE INVENTION

In the field of the present invention, micro electro-mechanical systems (MEMs) are included being the technology of mechanical components on the micrometer size, which includes three dimensional lithographic features of various geometries. They are typically manufactured using planar processing similar to semiconductor processes such as surface micromachining and/or bulk micromachining. MEMS are often fabricated using modified silicon fabrication technology, molding and plating, electro-discharge machining and other technologies capable of manufacturing very small devices.

The field of the present invention also embraces techniques that use nanometer-sized tips for imaging and investigating the structure of materials down to the atomic scale. Such techniques include scanning tunneling microscopy (STM) and atomic force microscopy (AFM), as disclosed in U.S. Pat. No. 4,343,993 and EP 0 223 918 B1.

Based on the developments in scanning tunneling microscopy and atomic force microscopy, new storage concepts have been introduced over the past few years that profit from these technologies. Probes having a nanoscale tip have been introduced for modifying the topography and for scanning an appropriate storage medium. Data are written as sequences of bits represented by topographical marks, such as indentation marks and non-indentation marks. The tips comprise apexes with a nanometer-sized diameter and the indentation marks have a comparable diameter, for example, a diameter in the range of 30 to 40 nm. Hence, these data storage concepts promise ultra-high storage area density.

In STM, a nanometer-sized tip is scanned in close proximity to a surface. The voltage applied therebetween gives rise to a tunnel current that depends on the tip-surface separation. From a data-storage point of view, such a technique may be used to image or sense topographic changes on a flat medium that represent a stored information in logical "0"s and "1"s. In order to achieve a reasonably stable current, the tip-sample separation must be maintained extremely small and fairly constant. In STM, the surface to be scanned needs to be a conductive material.

In AFM, the tip rests on one end of a soft spring cantilever. When the tip is brought in close proximity to a surface, resultant forces therebetween cause bending of the spring cantilever and so may be sensed.

A storage device for storing data based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. During operation, the probes scan an assigned field of the storage medium in parallel. In this way, high data rates may be achieved. The storage medium comprises a polymethyl-methacrylate (PMMA) layer. The nanometer-sized tips are moved across the surface of the polymer layer in a contact mode. The contact mode is achieved by applying small forces to the probes so that the tips of the probes can touch the surface of the storage medium. For this purpose, the probes comprise cantilevers which carry the tips on their end sections. Bits are represented by indentation marks or non-indentation marks in the polymer layer. The cantilevers respond to these topographic changes in the surface while they are moved across it.

Indentation marks are formed on the polymer surface by thermomechanical recording. This is achieved by heating a respective probe with a current or voltage pulse during the contact mode in a way that the polymer layer is softened locally where the tip touches the polymer layer. The result is an indentation, for example, having a nanoscale diameter, being formed in the layer.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is in this case more efficient. As a consequence of this, the temperature of the cantilever decreases and hence, its resistance changes. This change of resistance is then measured and serves as the measuring signal. Reading and/or writing the marks is accomplished by moving the probes relative to the storage medium in lines within a track and moving to the next track when the end of the respective line has been reached.

It is a challenge to provide a device and method for sensing a position of a probe.

SUMMARY OF THE INVENTION

According to an embodiment of a first aspect of the present invention, there is provided a device for sensing a position of a probe relative to a reference medium, the probe comprising a heater element with a temperature dependent electrical resistance, the device being operable to determine the position by measuring a parameter associated with a thermal relaxation time of the heater element.

An embodiment of the present invention has the advantage of improved response properties and may be distinguished by superior 1/f noise and superior drift properties when compared to a previously-proposed method entailing direct measurement of a heater element's temperature via a resistance measurement of the heater. The present invention is further distinguished in that a translation of an analog position signal into a digital time domain is enabled. This may render it unnecessary to measure small analog signals on an absolute scale. Additionally, this may further substantially reduce manufacturing tolerance-related sensitivity and accuracy problems.

An embodiment of the first aspect may comprise a relaxation oscillator circuit, the relaxation oscillator circuit being operable to apply a bias voltage potential to the heater element.

The relaxation oscillator circuit is distinguished by a simple circuit design. In contrast, previously-proposed techniques entailing direct electrical resistance measurements require complex circuitry, for example, linear amplifiers.

The relaxation oscillator circuit may further comprise a current threshold switching unit that is operable to perform a first switching act, the first switching act comprising switching the bias voltage potential from a first bias voltage potential to a second bias voltage potential when a first current threshold is reached and to perform a second switching act, the second switching act comprising switching the second bias potential to the first bias voltage potential when a second current threshold is reached.

By way of the current threshold switching unit, the probe position with respect to a reference medium can be determined with simple circuitry.

The current threshold switching unit may be configured to perform multiple of the first and second switching acts consecutively.

This has the advantage that, when the electrical current of the heater element attains one of the current threshold values, this automatically triggers the current threshold switching unit to perform a switching act so that the other of the current threshold values is reached. This cycle is continuously repeated until terminated by external user intervention.

In the above case, the parameter is preferably a switching frequency of the switching unit.

Use of the switching frequency to determine the probe position renders basically a digital signal and results in minimal effort to derive the position of the probe. Depending on the operating point, this also ensures a reduced noise level, especially with respect to 1/f noise.

Alternatively, the current threshold unit may be configured to perform one of the first and second switching acts. In this case, the parameter is preferably a duration of time from applying one of the first and second bias voltage potentials to reaching the corresponding first or second electrical current thresholds.

In this case, the current threshold switching unit is configured to terminate operation once an electrical threshold is reached. For example, if the switching unit is configured to perform the first switching act, then once the first electrical current threshold is reached, operation of the relaxation oscillator is terminated. Only if an external trigger is provided, operation is resumed and the next stage of operation is conducted, that is, the second switching act is performed. In this case, the probe position above the storage medium can be obtained by measuring the duration of time taken to attain the current threshold value corresponding to the switching act that is performed. This mode of operation—the so-called single shot mode—is especially advantageous if the determination of the probe position is synchronized with non-repetitive trigger events.

In the present embodiment, the first current threshold may be greater than a steady state current corresponding to the first bias voltage potential and the second current threshold is less than a steady state current corresponding to the second bias voltage potential and the first bias voltage potential is greater than the second voltage potential.

The steady state electrical current is the electrical current, which is finally reached after changing a bias voltage potential if the respective position of the probe was not changed. Values for the first and second current thresholds and first and second bias voltage potentials are chosen to ensure efficient and accurate operation of the first embodiment.

According to another embodiment of the first aspect of the present invention, the device may comprise an LC-resonating circuit, the capacitive element thereof being the heater element, and wherein the parameter is a resonance frequency of the LC-resonating circuit.

Such a device is in particular practical for low frequency applications.

According to yet another embodiment of the first aspect of the present invention, the device may comprise an RC delay line oscillator circuit and wherein the parameter is an oscillation frequency of the RC delay line oscillator.

The advantage of the RC delay line oscillator is that no inductor is needed.

According to yet another embodiment of the first aspect of the present invention, the device may comprise a bridge type oscillator circuit and wherein the parameter is an oscillation frequency of the bridge type oscillator.

The bridge type oscillator provides superior stability and phase noise performance.

According to yet another embodiment of the first aspect of the invention, wherein each one of the above-described relaxation oscillator circuit, LC-resonating circuit, RC delay line oscillator and bridge-type oscillator further comprises a phase-locking unit for synchronising the circuit to an external clock. In this way, position information contained in a control signal may be used for adjusting the frequency of the circuit in order to reduce a phase difference to the reference frequency. In this case, it is preferable that the parameter is a phase contrast signal output from the phase-locking unit. This is in particular advantageous if a mark representing logical information is present in the reference (storage) medium and the probe is scanned over the reference medium. In this case, the external clock signal and the exact mark position need not perfectly match, which makes the sensing more robust against fluctuations in the clocking signal.

Advantageously, the external clock may be operable to create a clocking signal corresponding to consecutive mark positions on the reference medium when the surface thereof is scanned by the probe.

In this way, a simple synchronization with mark positions is possible. There is only a need for a low sampling frequency and one may obtain at the same time high detection reliability.

Furthermore, a device embodying the first aspect of the present invention may be operable to control an overall loop gain of each one of the relaxation oscillator circuit, LC-resonating circuit, RC delay line oscillator circuit and bridge-type oscillator circuit so that the time it takes to establish a phase match is sufficiently long for a balance string of marks to be probed.

Marks are in this case preferably represented by indentations and non indentations. Whenever an indentation is probed during the time interval between two clocking pulses, the phase of the circuit decreases by a constant amount since the thermal relaxation time is slightly smaller than average and thus the electrical relaxation time is slightly slower than average as well. Conversely, the phase of the circuit increases by a constant amount if no indentation is probed between two clocking pulses. Hence, the digital information probed by the heater element is encoded in an integrated fashion in the phase signal, which then may be analyzed respectively.

In an embodiment of the first aspect of the present invention, the heater element is operated in a plateau region of a current/voltage interrelationship curve of the heater element.

In this way, 1/f noise may be reduced as an electrical relaxation time, also referred to as electrical time constant, of the heater element is then substantially independent from the operating point and only reflects the actual thermal relaxation time of the heater element.

According to an embodiment of a second aspect of the present invention, there is provided a method for sensing a position of a probe relative to a reference medium, the probe comprising a heater element with a temperature dependent electrical resistance comprising the step of measuring a parameter associated to a thermal relaxation time of the heater element.

The method aspect corresponds to the device aspect and embodiments thereof of the present invention.

Any of the device features may be applied to the method aspect of the invention and vice versa. Features of one aspect may be applied to any other aspect.

BRIEF DESCRIPTION OF THE DRAWINGS

Reference will now be made, by way of example, to the following drawings, in which.

DETAILED DESCRIPTION OF THE DRAWINGS

Figure 1:
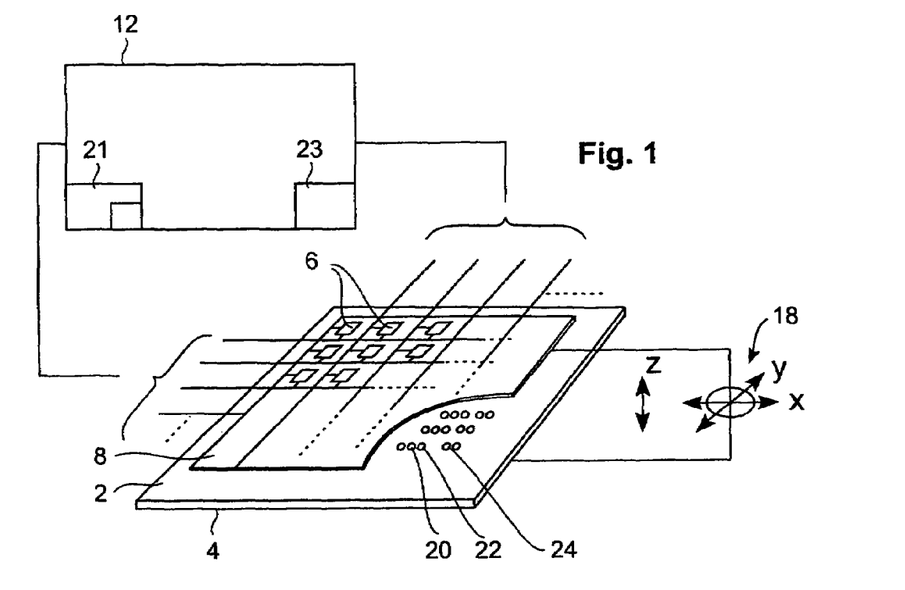
FIG. 1 is a perspective view of a storage device.

FIG. 1 shows a perspective view of a storage device, in particular for storing data. The storage device comprises a storage medium 2 that is preferably formed by a polymer layer. The storage medium 2 in this case embodies a reference medium. The polymer layer is preferably formed of a polymethylmethacryllate (PMMA) layer. The storage medium 2 may, however, also consist of different materials like an electrically conductive material. The storage medium 2 is supported by a substrate 4. The substrate 4 is preferably formed of silicon.

An array of probes 6 is mounted on a common frame 8. Only a few probes are shown in FIG. 1. The storage device may, however, comprise more probes 6, such as 1024 or an even significantly larger number. It may, however, also just comprise one or a few probes 6.

Each probe 6 comprises terminals, each of which are electrically connected to a control and information processing unit 12 via electrically conductive lines. The terminals may all be individually connected to the control and information processing unit 12. However, in order to reduce the complexity of the wiring, the terminals of the individual probes 6 may also be connected via row-lines and column-lines and possibly via multiplexers to the control and information processing unit 12.

The control and information processing unit 12 is designed for creating control parameters applied to the probes 6 via the terminals or sensing parameters present on the terminals, such as a current or a voltage potential for a write or read mode. The nature of the control parameters and the sensing parameters depends on the nature of the storage medium 2. The control and information processing unit 12 is also a device (21) for sensing a position of the probe 6 relative to the storage medium 2. The control and information processing unit 12 is further designed for controlling a movement of the storage medium 2 and the substrate 4 relative to the frame 8 in an x-, y- and z-direction by using a movement control circuit (23). The actuation for this is accomplished by a scanner 18.

Hence, the storage medium 2 and the frame 8 containing the probes 6 are movable relative to each other. In an alternative embodiment, the scanner 18 may act on the frame 8 in order to move the frame 8 in the x-, y- and z-direction relative to the storage medium 2 and the substrate 4. A relative movement in a z-direction may also be accomplished by applying respective electrostatic forces on the probes 6 possibly containing a capacitive platform forming a first electrode of a capacitor and further comprising a second electrode being arranged in a fixed position relative to the storage medium 2.

In the storage medium 2, reference numerals 20, 22 and 24 denote marks representing logical information. Preferably, they form topographic marks and may represent logical "1"s as indentations, whereas the absence of an indentation may represent logical "0"s. The marks 20, 22 and 24 are preferably of a nanoscale diameter. In FIG. 1, only a few marks 20, 22 and 24 are shown, which also do not represent their real physical properties. However, it can be appreciated that the marks 20, 22 and 24 may be greater in number and may represent more logic values than two.

Figures 2, 3:
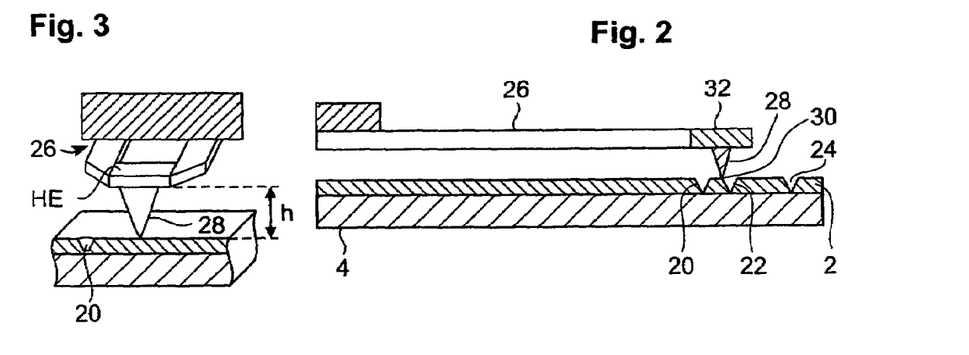
FIG. 2 is a cross-sectional view of part of the storage device shown in FIG. 1.
FIG. 3 shows a probe arranged in the storage device of FIG. 1, the probe being positioned above an indentation-free area of the storage medium.

In FIG. 2, a cross-sectional view of the data storage device of FIG. 1 is shown. Part of a probe 6 is shown. The probe 6 comprises a spring cantilever 26 on which a tip 28 is mounted, the tip 28 having an apex 30, which preferably has a nanometer-sized radius. The marks 20, 22 and 24, shown as indentation marks, are formed by pushing the apex 30 of the tip 28 into the storage medium 2.

The probe 6 comprises the spring cantilever 26 and a heater element HE for performing write/read operations. The heater element HE is formed as a temperature dependent resistor, which is thermally coupled to the tip 28. However, it does not need to be thermally coupled to the tip 28, especially if only read operations are performed. It can be appreciated that the write/read operations may also be performed by separate heater elements HE.

The spring cantilever 26 and the heater element HE preferably are fabricated from silicon. Electrically conductive connections to the terminals of the probe consist preferably of highly doped areas of the spring cantilever 26, whereas the heater element HE, in the case of being formed as a temperature dependent resistor, may be formed by less doped silicon, which yields a high electrical resistance. The doping concentration of the heater element HE may, for example, be in the range from $10^{16}$-$10^{18}$ cm$^{-3}$.

In the case of the AFM based storage device, the tip 28 does not need to be electrically conductive. The tip may also be formed from a different material, such as a magnetic material.

Figure 4:
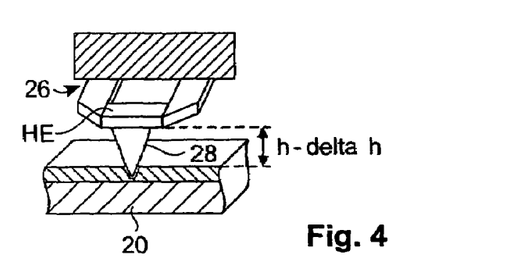
FIG. 4 shows the probe lowered in an indentation on the storage medium of device of FIG. 1.

As can be seen most clearly from FIG. 3, the heater element HE is spaced apart from the storage medium 2 at a distance h, if the apex is in an area of the storage medium 2 without an indentation, and at a distance h—delta h if the apex is moved into an indentation (see FIG. 4).

During operation of the storage device, each probe 6 is moved across its respectively assigned field. It is moved along lines, each line forming a track. The data, which are represented by marks, are written and respectively read consecutively along the respective tracks and, at the end of each track, the respective probe 6 is moved to the next track.

A scanning direction is the direction of on track relative movement between each probe 6 and the storage medium 2. A cross track direction is the direction perpendicular to the scanning direction.

During the write mode, the probe 6 is scanned in the scanning direction in the line of the respective track. Marks 20, 22 and 24 are created by applying a heating pulse to the heater element HE via a respective current or voltage pulse. The heat dissipated from the heater element HE softens the storage medium 2 and the tip 28 forms a respective indentation at the mark 20, 22 and 24, if the spring cantilever 26 is imposed with a respective force. This force may be inherent to the mechanical properties of the spring cantilever 26. It may, however, also be created in another way, such as, for example, by an electrostatic force. In this case, a respective force pulse is imposed to the respective capacitor by charging the capacitor respectively. Alternatively, only a suitably chosen force pulse may be provided if cold writing should be achieved. The heating pulse and also the force pulse are time-synchronized in order to achieve a desired on-track distance between adjacent marks 20, 22 and 24. For that purpose, a clocking signal is used, which is created by a clocking signal unit of the control and information processing unit 12.

During a read mode, the probe 6 is scanned in the scanning direction along each line of the respective track. When the tip 28 reaches an indentation representing a mark 20, 22 and 24, the tip 28 moves into the respective indentation as the tip 28 is pressed onto the storage medium 2 with a given spring force. This movement into the respective indentation may then be sensed and in that way a respective indentation may be identified.

The principal of thermo-mechanical sensing, in the context of the present invention, is now described in further detail below.

The heater element HE is brought into proximity to the reference medium (typically less than one micrometer relative to the reference medium), which reference medium may be the storage medium 2 and which serves as a heat sinking surface. By electrically energizing the heater element HE, it attains a temperature T_H. The heater element's temperature, T_H, may therefore be determined by a balance between an electrical power P_EL applied to the heater element HE and the dissipation of the thermal energy. One of the dissipation paths is heat flux from the heater element HE to the heat sinking surface formed by the storage medium 2 and also the substrate 4. The amount of power dissipated through this path is proportional to a temperature difference of the temperature T_H of the heater element HE and the storage medium 2. On the other hand, the amount of power is inversely proportional to the distance h between the heater element HE and the heat sink that is the storage medium 2. Hence, with reference to a steady state condition concerning the electrical power P_EL and the temperature T_H of the heater element HE, the following equation holds:

$$\text{delta } T\_H = R\_th \cdot \text{delta } P\_EL + eta \cdot T\_H \cdot \text{delta } h/h \quad (1)$$

where R_th is the overall thermal resistance of the heater element HE including at least the thermally coupled part of the spring cantilever and in general all thermally coupled parts of the probe. Further, it also includes the medium in between the heater element HE and the storage medium 2. eta is an efficiency parameter, which measures the fraction of heat dissipation to the heat sink and which is typically in the order of 0.1 to 0.5 depending on the design of the probe 6.

Figure 5:
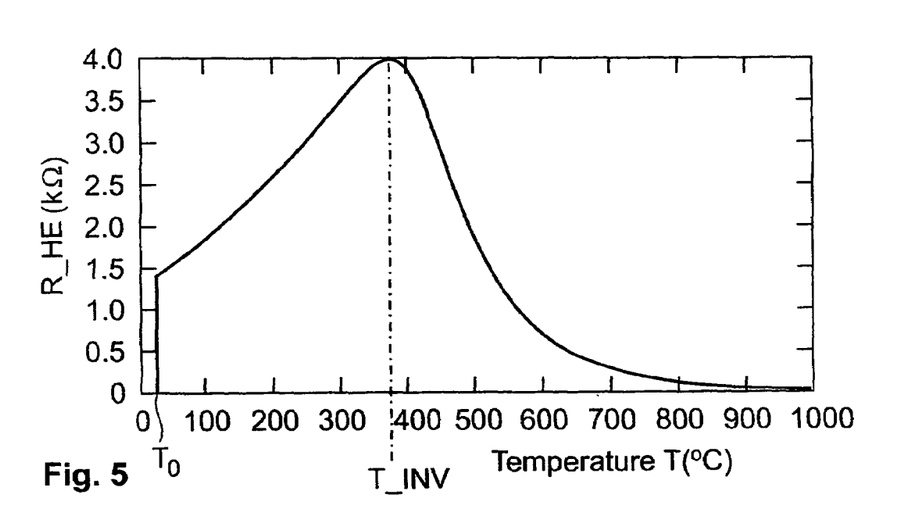
FIG. 5 is a plot of the electrical resistance of the heater element as a function of its temperature.
Figure 6:
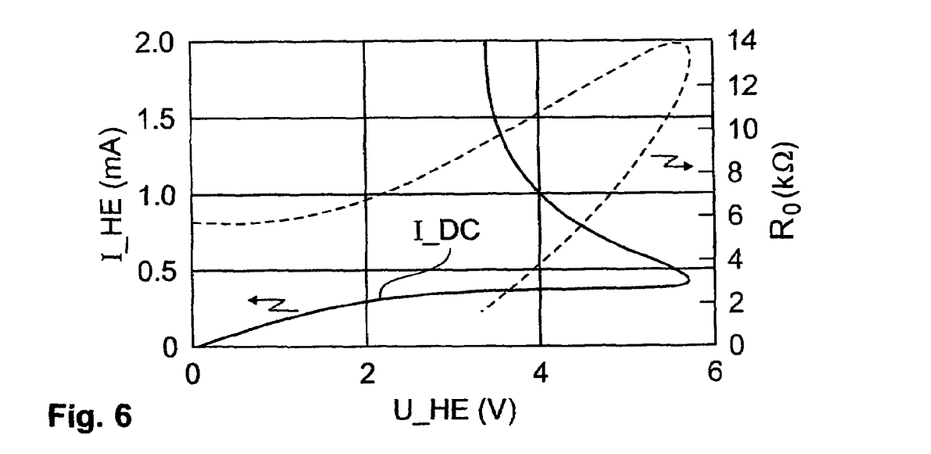
FIG. 6 illustrates a current/voltage interrelationship of the resistance of the heater element.

The principle of distance sensing exploits the fact that the electrical resistance R_HE of the heater element HE depends on the heater element's temperature T_H. FIG. 5 shows a typical plot of the electrical resistance R_HE of the heater element HE as a function of the temperature T. The electrical resistance R_HE of the heater element HE reaches a maximum value, which is of the order of 2 to 3 times the room temperature resistance, at an inversion in temperature T_INV. The inversion temperature T_INV is on the order of 400 to 650 degrees Celsius depending on the doping concentration. Above the inversion temperature T_INV, the resistance drops as a result of thermally generated charge carriers. As a result of this temperature dependence, non-linear current/voltage interrelationships are obtained as depicted in FIG. 6, with U_HE denoting the heater element potential difference, I_HE denoting the heater element electrical current and I_DC denoting a steady state current obtained in a steady state concerning the electrical power P_EL provided to the heater element HE and its position. A respective curve of the steady state current I_DC is referred to as current/voltage interrelationship curve. It is clearly visible in the current/voltage interrelationship curve that it has a plateau region ranging from around 2 volt to a little below 6 volts and a corresponding current from 0 to about 0.4 milliampere. In FIG. 6, each point of the current/voltage interrelationship curve corresponds to a different temperature of the heater element HE under the steady state condition concerning the distance h and, for the respective point, also a corresponding steady state electrical power P_EL, which may however vary from the respective points in the curve.

It is known to perform position sensing by monitoring the changes of the electrical operating point delta I_HE of the current change and delta U_HE of the heater element voltage potential change, which result from changes of the heater temperature delta T_H induced by a change of the distance delta h/h. One of the problems with this direct sensing method, in contrast to a direct translation of electrical properties to thermal properties, is the fact that current/voltage interrelationships are subject to erratic variations related to carrier density fluctuations which give rise to noise, in particular 1/f type noise and systematic sensing errors associated with aging and temperature changes of the substrate, which cause corresponding shifts of the operating point.

The position sensing mechanism according to an embodiment of the present invention circumvents these problems by sensing the thermal resistance via its influence on a thermal relaxation time, tau, of the heater element HE. tau is given by the following equation:

$$tau = C\_th \cdot R\_th \quad (2)$$

where C_th denotes the heat capacity of the heater element HE. The heat capacity C_th has the advantage that it remains constant. In analogy to equation 1, one can derive the following equation:

$$\text{delta } tau = tau \cdot eta \cdot \text{delta } h/h \quad (3)$$

Hence, changes of the distance delta h/h translate directly into corresponding changes of the thermal relaxation time tau independent of the electrical operating point of the heater element HE or also the probe 6 as reflected by the absence of the delta P_EL term in equation 3, which is a major source of error in the previously-described direct-sensing scheme.

Figure 7:
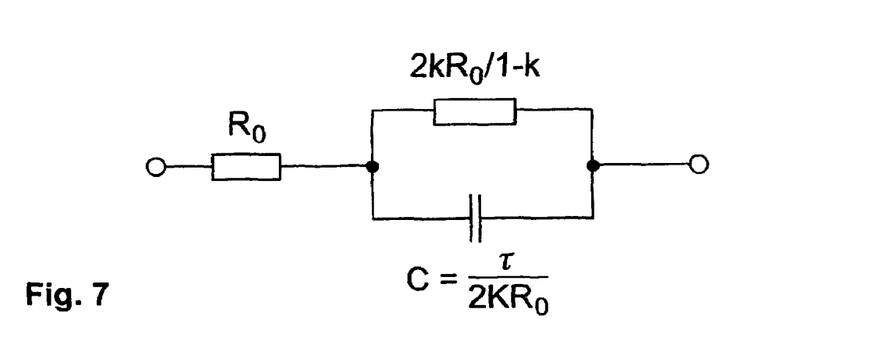
FIG. 7 is an electrical equivalent circuit of the heater element.

In order to probe the thermal relaxation time tau of the heater element HE, an electrical measurement is used. For minimal deviations from an operating point, being defined by minimal deviations from the distance h and the electrical power P_EL supplied, the electrical impedance of the heater element HE may be represented by an equivalent circuit as shown in FIG. 7. R_0 denotes an operating point electrical resistance of the heater element HE and may be derived from FIG. 6. A dimensionless constant k is given by:

$$k = (1 - R\_0 \cdot \text{delta } I\_HE/\text{delta } U\_HE)/(1 + R\_0 \cdot \text{delta } I\_HE/\text{delta } U\_HE) \quad (4)$$

with a delta I_HE/delta U_HE representing the slope of the current/voltage interrelationship curve at the operating point. In the already above mentioned horizontal plateau region of the current/voltage interrelationship curve, the constant k is therefore approximately equal to 1, irrespective of the operating point. Hence, an electrical time constant tau_el of the heater element HE is in this region substantially independent from the operating point and only reflects the thermal relaxation time tau of the heater element HE. The electrical relaxation time tau_el is given by:

$$tau\_el = R\_0 * C\_HE = tau/(2*k) \quad (5)$$

The above-stated relationship is exploited in the present invention in order to determine the probe position above a reference medium. Embodiments according to the present invention will now be described in further detail below.

First Embodiment

Figure 8:
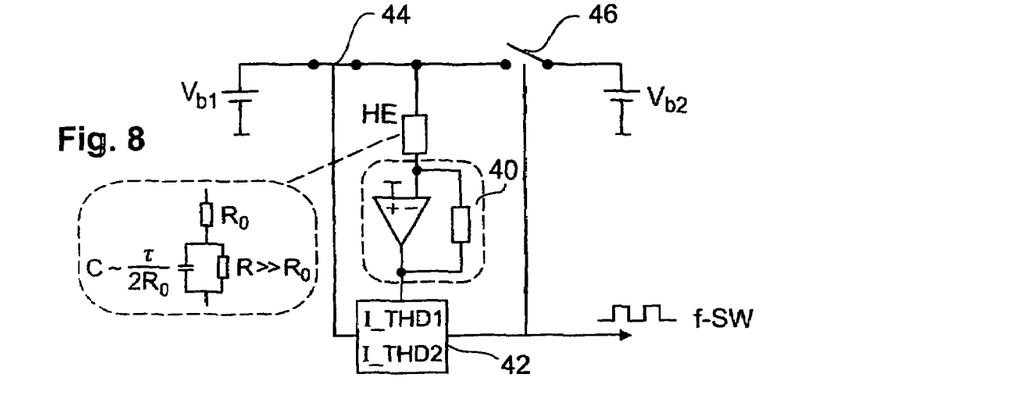
FIG. 8 is a circuit diagram of a relaxation oscillator embodying the present invention.

A first embodiment of the present invention comprises a relaxation oscillator circuit, which is shown in FIG. 8. It is, during operation, electrically connected to the heater element HE of the respective probe 6. It is arranged in the control and information processing unit 12. It comprises voltage sources being designed for generating a first and a second bias voltage potential V_b1, V_b2, respectively.

The heater element HE may be represented by its electrical equivalent circuit according to FIG. 7. When operating an electrical heater in the area of the plateau region of the current/voltage interrelationship curve I_DC, the parallel resistance to the electrical capacitance C_HE of the heater element HE may be assumed to be significantly greater than the operating point electrical resistance R_0. It is to be noted that the operating point may be represented by a current source being arranged in a parallel fashion to the equivalent circuit according to FIG. 7.

The heater element HE is on one side electrically connected to a current/voltage converter 40. The current/voltage converter 40 is electrically connected to a current threshold detector 42. The current threshold detector 42 is preferably designed to compare its input voltage, which is representative of the heater element electrical current I_HE, to at least one electrical current threshold, preferably to two electrical current thresholds, which are referred to as first electrical current threshold I_THD1 and second electrical current threshold I_THD2. The current threshold detector 42 is part of a current threshold switching unit, which further comprises a first switch 44 and a second switch 46. The current threshold detector 42 is further designed for creating a signal having a switching frequency f_SW.

Figure 9:
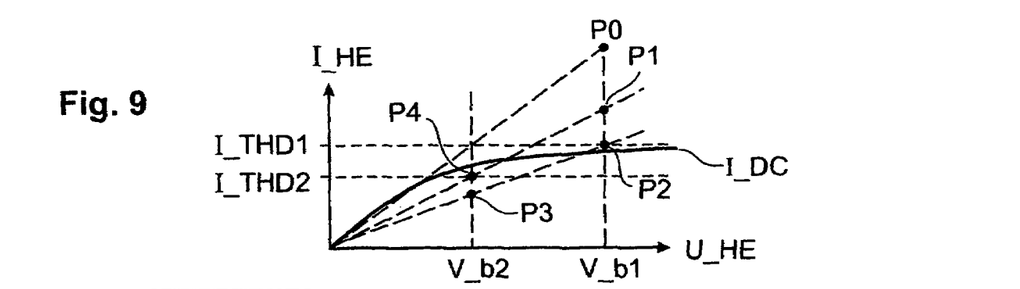
FIG. 9 is a current/voltage diagram corresponding to the relaxation oscillator shown in FIG. 8.

Operation of the relaxation oscillator circuit shown in FIG. 8 is now described with the aid of FIG. 9 in the following steps:

(i) In FIG. 9, operation starts from a "cold" heater element HE, i.e. at the origin of the FIG. 9 plot. When the first switch 44 is closed, the first bias voltage potential V_b1 is applied to the heater element HE. This causes the electrical current I_HE value to instantly increase to a value denoted by P0, which value corresponds to the first bias voltage potential V_b1 divided by the operating point electrical resistance R_0 of the heating element when the first switch 44 is closed, i.e. its electrical resistance when it is cold. As can be seen from FIG. 9, the electrical current I_HE value at P0 is significantly larger than the steady state current I_DC corresponding to the first bias voltage potential V_b1;

(ii) Ramping of the I_HE value in step (i) causes the heater element HE to gradually heat, this being equivalent to the electrical capacitance C_HE of the heater element HE being charged. Then, and in order for a steady state to be attained, the current approaches the current/voltage interrelationship curve I_DC in an exponential relaxation mode. At a time corresponding to a point P2, the heater element electrical current I_HE reaches the first electrical current threshold I_THD1. This triggers the switching unit to open the first switch 44 and close the second switch 46. This results in the second bias voltage potential V_b2 being applied to the heater element HE and the I_HE value to instantly decrease to a value denoted by P3 in FIG. 9. The I_HE value at P3 depends on the operating point electrical resistance R_0 at point P2—it may be obtained as the current value corresponding to an intersection point, which point lies on a straight line connecting P2 to the origin of the FIG. 9 plot and corresponds to the second bias voltage potential V_b2. As can be seen from FIG. 9, at P3, the heater element electrical current I_HE is significantly smaller than the steady state current I_DC corresponding to the second bias voltage potential V_b2; and (iii) After the electrical current of the heater element drops to P3, the heater element cools down, which corresponds to the discharge of the electrical capacitance C_HE. The discharge process causes a gradual rise in the heater element electrical current I_HE until, at a point of time corresponding to point P4 on FIG. 9, the second electrical current threshold I_THD2 is reached. This triggers the current threshold switching unit to open the second switch 46 and close the first switch 44, which then results in the I_HE being ramped up to P1. At P1, the heater element electrical current I_HE, which is given by the first bias voltage potential V_b1 divided by the operating point electrical resistance R_0 corresponding to point P4, is significantly larger than the steady state current I_DC corresponding to the first bias voltage potential V_b1.

The above-described mode of operating the circuit of FIG. 8 has henceforth been referred to as the steady state relaxation oscillation mode. Furthermore, operation has been shown to start from a cold heater element HE in FIG. 9 by way of example, but as can be appreciated, another starting point based on the condition of the bias voltage potential value being less than V_b1 can be used.

The oscillation frequency of the circuit shown in FIG. 8, which is in a fixed relation and proportional to the switching frequency f_SW of the switching unit, depends on the choice of the first and second bias voltage potentials V_b1, V_b2 and the first and second electrical current threshold I_THD1, I_THD2. In an embodiment of the present invention, values for these variables are chosen in order to enable the above-explained steady state relaxation oscillation mode. In the present embodiment, the first current threshold I_THD1 is chosen to be larger than the steady state current I_DC corresponding to the first bias voltage potential V_b1 and the second electrical current threshold I_THD_2 to be less than the steady state current I_DC corresponding to the second bias voltage potential V_b2. Also, f_SW is adjusted to range from 0.1 times the electrical relaxation time tau_el up to 10 times the electrical relaxation time tau_el.

The switching frequency f_SW, which is proportional to the electrical relaxation time tau_el, is also, in the view of equation 5, proportional to the thermal relaxation time tau. Hence, the switching frequency f_SW can be used to measure the thermal relaxation time and, in the view of equation 3, a change in the distance h of the heater element HE with respect to the storage medium 2. Thus, it can be appreciated that the distance h from the heater element HE to the storage medium 2 may be obtained in dependence on the switching frequency f_SW. For this purpose, a characteristic curve or field may be provided, from which respective values of the distance h may be derived depending on the switching frequency f_SW. Alternatively, the distance h may also be obtained dependent on the duration of a time from reaching point P1 to reaching point P2 or from reaching point P3 to reaching point P4 or from reaching point P0 to reaching point P2.

The above-described embodiment of the present invention may be operated in two main modes, namely, in continuous mode or single-shot mode.

In the continuous mode, the steady state relaxation mode is continuously repeated, that is, the circuit of FIG. 8 is operated to continuously repeat the cycle in accordance with operating steps (i) to (iii) above. This mode relies on the fact that, when the I_HE value attains one of the current threshold values, I_THD1, I_THD2, this automatically triggers the switching unit to control the opening/closing of switches 44, 46, as appropriate. This mode of operation is continuous until terminated by external user intervention.

By contrast, in the single shot mode, the circuit of FIG. 8 is configured to terminate operation once an electrical threshold is reached. For example, when switch 44 is closed and switch 46 is opened, and once I_THD1 is reached (corresponding to the transition of I_HE from P0 to P2), operation of the relaxation oscillator is terminated. Only if an external trigger is provided, operation is resumed and the next stage of operation is conducted, that is, switch 44 is opened and switch 46 is closed in order to effect transition of I_HE from P3 to P4 so that the value I_THD2 is attained. In this mode of operation, the distance h of the probe 6 above the storage medium 2 can be obtained by measuring the duration of time taken to attain the current threshold value, for example, in the above-described case, the distance h can be determined from the duration of time between transition points P0 to P2.

The single shot mode is especially advantageous if the determination of the distance h is synchronized with non-repetitive trigger events. An arbitrary voltage potential may be applied to the heater element HE, such as a reference voltage potential, in this operation mode.

Second Embodiment

Figure 10:
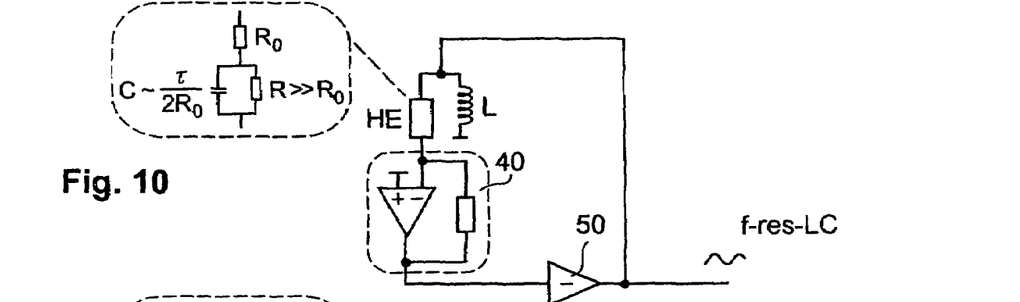
FIG. 10 is a circuit diagram of an LC-resonating circuit embodying the present invention.

A second embodiment of an electronic circuit enabling the sensing of the position of the heater element HE relative to the storage medium 2 comprises an LC-resonating circuit and is shown in FIG. 10. During operation of the circuit, the heater element HE is electrically connected on one side to the current/voltage converter 40 and on the other hand the heater element is connected to an output of a feedback amplifier 50. The heater element HE is arranged electrically in parallel to an inductance L.

The output of the feedback amplifier 50 has a signal that is representative of the resonance frequency f_RES_LC of the LC-resonating circuit. A Q factor will be of order unity for resonance frequencies comparable to 1/tau_el, which renders this circuit practical preferably for low frequency applications (f_RES_LC<<1/tau_el). The Q factor, or quality factor, is a measure of the "quality" of a resonant system. On a graph of response versus frequency, the bandwidth is defined as the 3 dB change in voltage level in respect to the resonant frequency. The Q factor is given by the resonant frequency divided by the bandwidth. In the case of the LC-resonating circuit, the Q-factor is given by $1/(2\Pi*f\_RES\_LC*C\_HE*R\_0)$.

In this embodiment, the resonant frequency f_RES_LC is proportional to the electrical relaxation time tau_el and, hence, the thermal relaxation time tau. Preferably, the inductance L is chosen to have an inductance value of around $L=1/((2\Pi*f\_RES\_LC)^2*C\_HE)$.

Third Embodiment

Figure 11:
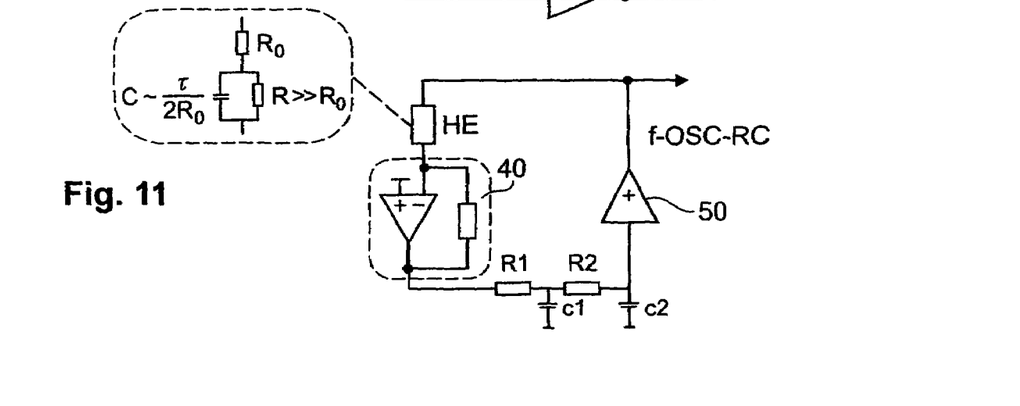
FIG. 11 is a circuit diagram of an RC delay line oscillator embodying the present invention.

A third embodiment comprises a RC delay line oscillator and is shown in FIG. 11. The electrical resistors R1 and R2 and the capacitors C1 and C2 are preferably dimensioned in the order of the operating point electrical resistance R_0 and respectively the electrical capacitance C_HE of the heater element HE. More preferably, they match the respective operating point electrical resistance R_0 and respectively the electrical capacitance C_HE of the heater element HE in a range of at maximum a factor 2 to 3. The advantage is that the resistors R1, R2 and the capacitors C1 and C2 do not have to exactly match the operating point electrical resistance R_0 and/or respectively the electrical capacitance C_HE of the heater element HE in order to obtain a signal that appropriately measures the thermal relaxation time tau. The RC delay line oscillator further comprises the current/voltage converter 40 and the feedback amplifier 50.

The output of the feedback amplifier 50 is representative of an oscillation frequency f_osc_RC of the RC delay line oscillator. The oscillation frequency f_osc_RC is representative of the electrical relaxation time tau_el and, in this way, of the thermal relaxation time tau.

Fourth Embodiment

Figure 12:
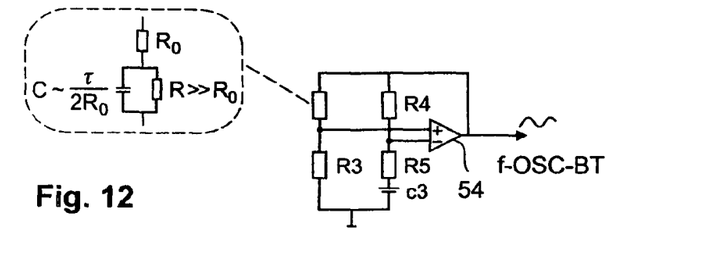
FIG. 12 is a circuit diagram of a bridge type oscillator embodying the present invention.

A fourth embodiment of the present invention comprises a bridge type oscillator and is shown in FIG. 12. In this case, the bridge type oscillator is a type of wien bridge. The resistors R3, R4, R5 and the capacitor C3 are preferably dimensioned in a similar way as the resistor R_0 and capacitor C_HE. The bridge type oscillator further comprises a differential amplifier 54 whose inputs are connected electrically between the heater element and the resistor R3 and, respectively, the resistor R4 and R5. The output signal of the differential amplifier 54 has a frequency that is representative of an oscillation frequency f_osc_bt of the bridge type oscillator. f_osc_bt is representative of the electrical relaxation time tau_el and, therefore, the thermal relaxation time tau. The oscillation frequency f_osc_bt of the bridge type oscillator is then evaluated, as in other embodiments of the present invention, in the control and information processing unit 12 in order to obtain the distance h of the heater element HE from the storage medium 2.

Fifth Embodiment

Figure 13:
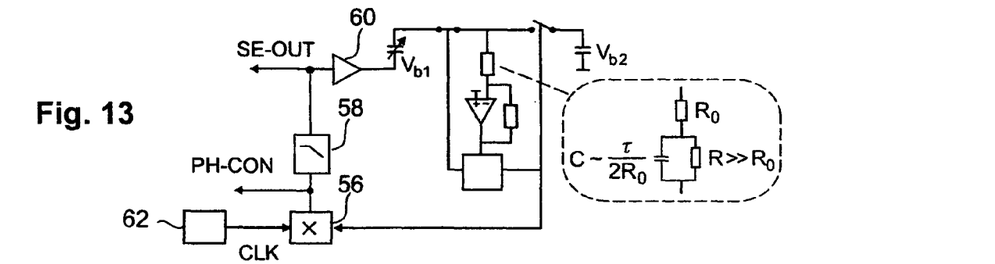
FIG. 13 is a circuit diagram of an oscillator with a phase locked loop unit.

In a further embodiment as shown in FIG. 13, the relaxation oscillator according to the first embodiment shown in FIG. 8 additionally comprises a phase locking unit. The phase locking unit comprises a phase detector 56, a loop filter 58 and an amplifier 60. By way of the phase locking unit, the relaxation oscillator may be synchronized to an external clock 62. The distance h of the heater element HE from the storage medium 2 may then be derived from a control signal used for adjusting the frequency of the oscillator to the reference frequency, which reference frequency is given by the frequency of a clocking signal CLK generated by the external clock 62. The phase locking unit is just shown in its application to the relaxation oscillator by way of example. It may, however, also be applied to any of the other embodiments of the present invention.

Preferably, the phase detector 56 creates, as output, a phase contrast signal PH_CON being representative of the phase shift between its two input signals. The phase contrast signal PH_CON is then filtered in a loop filter 58. The output of loop filter 58 is then a sensor output signal SE_OUT that is amplified in the amplifier 60 and then serves to adjust either the first or the second bias voltage potential V_b1, V_b2.

The loop filter 58 preferably has a pole at zero frequency which assures a fixed phase relation with respect to the clocking signal CLK, which preferably marks a nominal position of a mark represented by the presence or absence of an indentation. The phase contrast PH_CON may be used to measure the thermal relaxation time tau and, hence, to determine the distance h of the heater element from the storage medium 2.

The phase locking unit has the effect that, whenever an indentation is probed during the time interval between two pulses of the clocking signal, the phase of the oscillator decreases by a constant amount since the thermal relaxation time tau is slightly smaller than an average and thus the electrical relaxation time tau is slightly slower than an average as well. Conversely, the phase of the oscillator increases by a constant amount, if no indentation is probed between two consecutive pulses of the clocking signal CLK. Hence, that the digital information probed by the heating element HE is encoded in an integrated fashion in the phase contrast, the signal PH_CON may then be evaluated accordingly in the control and information processing unit 12 in order to obtain the actual distance h of the heater element HE from the storage medium 2. Indentations may, for example, represent logic variables and may, in that way, be detected as they correspond to jumps in the phase contrast signal PH_CON.

By choosing the parameters of the loop filter 58, the sensor output signal SE_OUT may represent a check sum over a bit string represented by the marks and may in that way be exploited for error correction already in a read channel. In this context, it is preferred that the data stored on the storage medium 2 and being represented by the marks 20, 22 and 24 is encoded in a balanced code meaning that a given amount of consecutive bits always has a given check sum. For this purpose, the parameters, especially the response time of the loop filter 58, is chosen in a way that is preferably at least as long as the time it is needed to scan over the given amount of bits in a bit-sequence rendering a given check sum. Typically, such balanced codes are balanced in their check sum over around 10 to 20 bits.

Another significant advantage of using the phase contrast signal PH_CON is the fact that the external clock signal CLK and the exact on track position of the respective marks 20, 22 and 24 do not need to perfectly match, which makes the sensing more robust against clocking signal CLK fluctuations.

Figure 14:
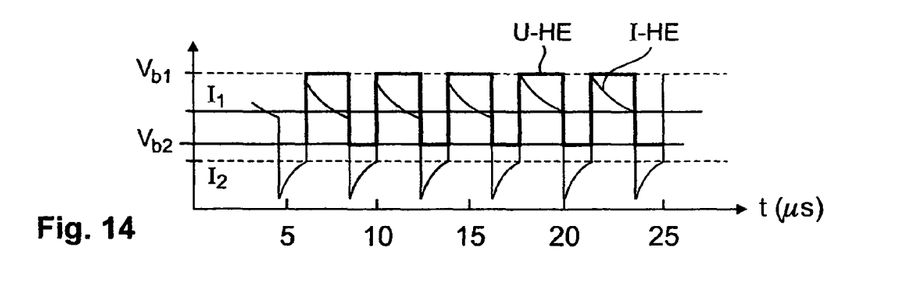
FIG. 14 shows a plot of the heater element, I_HE, and heater element potential difference, U_HE, respectively plotted as a function of time, t, during operation of the relaxation oscillator shown in FIG. 8.

In FIG. 14, the heater element electrical current I_HE and the heater element potential difference U_HE are plotted over the time t for an operation of the relaxation oscillator according to FIG. 8. They are plotted for a heater element with room temperature electrical resistance of around 30 k-Ohm which rises to values in the order of 60 k-Ohm in the plateau region of the current/voltage interrelationship curve. The steady state oscillation is 280 kilohertz. For that purpose, the thermal relaxation time tau of the heater element is in the order of 5 microseconds. The bias voltage potentials are, by way of example, for the first bias voltage potential V_b1 around 8 volt and for the second bias voltage potential V_b2 around 2.5 volts corresponding to steady state current I_DC of the order of 140 micro Ampere and 75 micro Ampere, respectively. The first and second electrical current threshold I_THD_1, I_THD_2 may in this case be chosen to be around 170 micro Amperes and respectively 60 micro Amperes.

Figure 15:
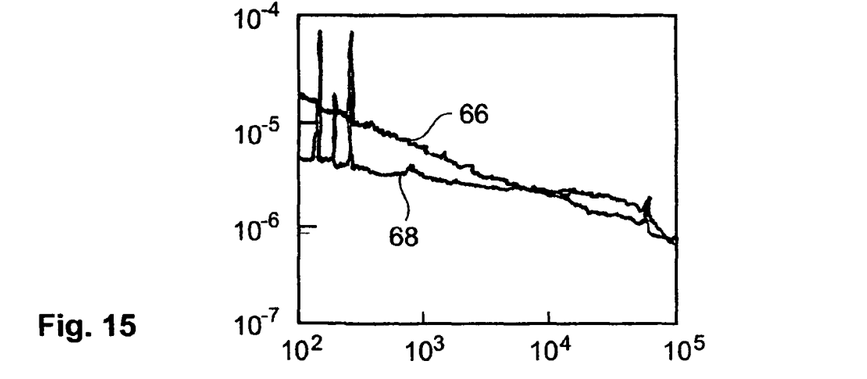
FIG. 15 respectively illustrates the power spectral densities of an embodiment of the present invention and a previously-proposed technique.

FIG. 15 shows the power spectral densities of the relaxation oscillator according to the first embodiment of the present invention, which is denoted by 66, and the power spectral density 68 when applying the previously-proposed measuring method of directly measuring the resistance of the heater element. This plot demonstrates that substantially improved 1/f noise characteristics are obtained with an embodiment of the present invention.

In an embodiment of the present invention, the control and information processing unit 12 is designed for detecting output signals of a respective circuit and then deriving the respective distance h of the heater element HE from the storage medium 2.

In an embodiment of the present invention, tau ranges from 0 to 1 second, and preferably from 0.1 microsecond to 0.1 millisecond.

Embodiments of the present invention have been explained above in relation to a storage device, in particular for storing data, by way of example. They are however not limited to the specific embodiments. It will be understood that the present invention has been described purely by way of example, and modifications of detail can be made within the scope of the invention.

Each feature disclosed in the description and (where appropriate) the claims and drawings may be provided independently or in any appropriate combination.

The invention claimed is:

1. A probe device for sensing topographical variations on a reference medium comprising:
   a heater element with a temperature dependent electrical resistance disposed at a tip of said probe device;
   an oscillator circuit electrically connected to said heater element;
   measurement means for measuring a parameter associated with a thermal relaxation time for said heater element, said measurement means being connected to provide a measured parameter to a position determining means; and
   position determining means for receiving said measured parameter and determining probe position based on said measured parameter;
   wherein said measured parameter is an oscillation frequency of said oscillator circuit.

2. The probe device according to claim 1 wherein the oscillator circuit is a bridge type oscillator circuit and wherein said parameter is an oscillation frequency of said bridge type oscillator.

* * * * *